(12) United States Patent
Muramatsu et al.

(10) Patent No.: US 6,522,829 B1
(45) Date of Patent: Feb. 18, 2003

(54) DATA REPRODUCING APPARATUS, DATA RECORDING AND REPRODUCING APPARATUS, DATA REPRODUCING METHOD AND DATA RECORDING AND REPRODUCING METHOD

(75) Inventors: Kenichi Muramatsu, Kanagawa (JP); Hiroshi Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/340,819

(22) Filed: Jun. 28, 1999

(30) Foreign Application Priority Data

Jun. 30, 1998 (JP) .......................................... 10-185050

(51) Int. Cl.⁷ ................................................ H04N 5/93
(52) U.S. Cl. ........................................ 386/52; 386/111
(58) Field of Search ................................ 386/4, 33, 45, 386/52–54, 64, 98, 104, 111–112, 125–126, 75; 360/13; 369/83; 725/87, 91

(56) References Cited

U.S. PATENT DOCUMENTS

| | | | | |
|---|---|---|---|---|
| 4,305,131 A | * | 12/1981 | Best | 386/4 |
| 5,239,430 A | * | 8/1993 | Koishikawa et al. | 386/75 |
| 5,719,985 A | * | 2/1998 | Ito et al. | 386/125 |
| 6,018,765 A | * | 1/2000 | Durana et al. | 725/87 |
| 6,301,429 B1 | * | 10/2001 | Hirosawa | 386/53 |

\* cited by examiner

*Primary Examiner*—Thai Tran
*Assistant Examiner*—Christopher Onuaku
(74) *Attorney, Agent, or Firm*—Frommer Lawrence & Haug LLP; William S. Frommer; Darren M. Simon

(57) ABSTRACT

The invention relates to a data recording and reproducing apparatus capable of highly accurate editing such as a cross-fade and a mute on audio signal by use of randomly accessible recording medium such as RAID in a broadcasting station. The inventive apparatus comprises a plurality of encoders, a plurality of decoders, an RAID and a system controller 115. The encoders and decoders respectively are accessible to the RAID in their allocated time slot. In the decoder, flag inserting circuit for inserting flag designating editing process into portions of audio data read from the RAID, is included. Edit DSP circuit performs the editing process on the audio data, based on the flag inserted into the audio data.

8 Claims, 7 Drawing Sheets

DATA REPRODUCING APPARATUS, DATA RECORDING AND REPRODUCING APPARATUS, DATA REPRODUCING METHOD AND DATA RECORDING AND REPRODUCING METHOD

BACKGROUND OF THE INVENTION

1. Field of the Invention

This invention relates generally to a data reproducing apparatus, a data recording and reproducing apparatus, a data reproducing method and a data recording and reproducing method. More particularly, the invention relates to a data reproducing apparatus, a data recording and reproducing apparatus, a data reproducing method and a data recording and reproducing method, each of which is capable of obtaining a highly accurate editing processes (effect processes) such as a cross-fade and a mute on digital data such as audio signal by inserting editing-process-designating information into portions of the reproduced digital data and carrying out the editing processes on the digital data, based on the editing-process-designating information through the use of appropriate data processing means.

2. Description of Relevant Art

A requirement that, for example, one data recording and reproducing means records and reproduces on and from a plurality of data recording and reproducing means the data for audio and/or video concurrently as well as it reproduces said data while recording them with information being provided through the multi-channel for the widespread use of the CATV or the like, has increased in recent years. Said requirement is different from that of the conventional VTR (Video Tape Recorder). To meet the above requirement, video sever or AV (Audio and/or Video) server that records and reproduces the data for audio and/or video by using a recording medium such as a hard disc to which the data is randomly accessible, has been widely available.

Generally, AV server used in a broadcasting station has to maintain a high transmission rate of the data on account of the maintenance of the qualities of picture and sound necessary for broadcasting and to have a large enough storage capacity necessary to record the data for a long time. For this reason, an attempt in such a manner as to use the data recording and reproducing apparatus including a plurality of hard disc drives (HDD), which may store the data for audio and/or video and perform the parallel processing of the data, has been already made thereby allowing the high transmission rate of the data and obtaining a large enough storage capacity. Another attempt in such a manner as to record parity check data has also been made thereby ensuring reliability in the event of causing trouble in any HDD.

Thus, when the contents of programs provided by the stations and the number of channel necessary for a broadcasting form are different, a multi-channel AV server for dealing with effectively variations in usage pattern, for example, VOD (Video On Demand) and NVOD (Near Video On Demand), may be implemented by transmitting through the multi-channel concurrently a plurality of the material data comprising the audio data and/or video data, which have been recorded distributively on the recording media, or by reproducing the same material data received through the multi-channel with a reproducing time shifting.

The data recording and reproducing apparatus used in such an AV server utilizes an RAID (Redundant Arrays of Inexpensive Disks) technology. The RAID comprises a plurality of HDD, each of which is composed of a plurality of hard discs. Said RAID technology was set forth in a thesis, "A Case for Redundant Arrays of Inexpensive Disks (RAID)", ACM SIGMOND Conference, Chicago, III, Jun. 1–3, 1988, authored by D. A. Patterson et al.

In said thesis, the RAID technology is classified by five levels, namely, RAID-1 through RAID-5 levels.

For example, in the RAID-1 level, two data each including same contents are written into two HDDs.

In the RAID-3 level, input data is divided into the data groups having a set length and the data groups are recorded on a plurality of HDDs. Further, parity data that is exclusive OR of the data block corresponding to each of the HDDs are produced. Said parity data is written on another HDD.

In the RAID-5 level, input data is divided into the data blocks being larger than the data groups of the above RAID-3 level, and each of divided data is recorded on each of HDDs as the data block. In this case, the parity data that is issued from exclusive OR of the data block corresponding to each of the HDDs, is recorded on other HDDs as parity block and the parity block is distributed to other HDDs. Regarding the remaining RAID levels, refer to the above thesis.

On the other hand, broadcasting station stores material (data composed of audio and video data: hereinafter called "the material") to be used in news program and the like in the video server once. Then, the station edits the material to send out the edited material that is necessary for a program etc. to be broadcast.

When the station edits the different materials so that they put together, video material is often subject to special effects such as wipes and picture-in-picture, while audio material is often subject to editing processes such as a mute, a cross-fade and a fade-out (fade-in) to remove noise from areas before and after junctions (edit points) of the different audio materials.

The conventional VTR previously stores edit flags corresponding to audio signals in ancillary data areas on a recording tape. During data reproduction, the audio signal is subject to an effect process such as a mute based on the edit flag, whereby removal of the audio noise from areas before and after edit points is implemented.

However, the above video server does not store the edited material in the HDD again. In other words, while the above video server sends out the material that has stored once therein to an editor that is connected to the video server, the editor outputs only address information, not the edited material itself.

File system chiefly composing of file entry and record entry manages the material that has been stored once in the HDD of the video server. In this case, each of the record entries is represented by the starting position of address of file recorded on the HDD and the continuous area from the starting position. The edited material output from the editor is composed of information comprising file name, a starting position (address) for the reproduction and a terminating position (address) for the reproduction, exclusive of the edited material itself.

Although it is conceivable that the video server performs editing process on the audio material in the edited material with the audio material being timed appropriately during the sending of the material, there is a fear of sending out the material with the audio noise if the sending of the material is not well timed.

Further, although it is conceivable that the edit flags are stored in the HDD like the process in the VTR, the video server itself has not such a configuration that may store the edit flags because the video server manages the material using the above file system.

It is therefore an object of the present invention to provide a data reproducing apparatus and a data recording and reproducing apparatus each capable of carrying out highly accurate effect processes on the audio material in the case of using randomly accessible recording medium such as the HDD, and to provide a data reproducing method and a data recording and reproducing method, wherein highly accurate effect processes on the audio material may be carried out in the case of using randomly accessible recording medium such as the HDD.

SUMMARY OF THE INVENTION

In carrying out the invention and according to one aspect thereof, there is provided a data reproducing apparatus comprising nonlinear accessible recording medium and a plurality of outputting means for processing data read from the recording medium and outputting the processed data to outside, which are accessible to the recording medium in an allocated time slot. In the data reproducing apparatus, the outputting means includes inserting means for inserting editing-process-designating information designating editing process into portions of audio data read from the recording medium, and editing processing means for performing the editing process on the audio data output from the inserting means, based on the editing-process-designating information inserted into the audio data. The data reproducing apparatus of the invention may carry out highly accurate effect processes on the audio material in the case of using randomly accessible recording medium such as the HDD.

According to another aspect of the invention, there is provided a data recording and reproducing apparatus comprising nonlinear accessible recording medium, inputting means for processing data including audio and video data, which is input from outside, and outputting the processed data to the recording medium, and outputting means for processing data read from the recording medium and outputting the processed data to the outside. The inputting means and the outputting means are accessible to the recording medium in an allocated time slot. In the data recording and reproducing apparatus, the outputting means includes inserting means for inserting editing-process-designating information designating editing process into portions of audio data read from the recording medium, and editing processing means for performing the editing process on the audio data output from the inserting means, based on the editing-process-designating information inserted into the audio data. The data recording and reproducing apparatus of the invention may also carry out highly accurate effect processes on the audio material in the case of using randomly accessible recording medium such as the HDD.

According to further aspect of the invention, there is provided a data reproducing method for reproducing the data by using the above data reproducing apparatus, namely, the data reproducing apparatus as claimed in claim 1. The method comprises a first step and a second step. In the first step, the editing-process-designating information designating editing process of the audio data is inserted into portions of audio data read from the recording medium by the inserting means in the outputting means. Further, in the second step, the editing process is performed on the audio data, based on the editing-process-designating information inserted in the first step.

According to still another aspect of the invention, there is provided a data recording and reproducing method for recording and reproducing the data by using the above data recording and reproducing apparatus, namely, the data recording and reproducing apparatus as claimed in claim 5. The method comprises a first step and a second step. In the first step, editing-process-designating information designating editing process is inserted into portions of audio data read from the recording medium by the inserting means in the outputting means. Further, in the second step, the editing process is performed on the audio data, based on the editing-process-designating information inserted in the first step.

Other objects and advantages of the invention will become apparent by reference to the following portions of the specification and the accompanying drawings.

DETAILED DESCRIPTION OF THE PREFERRED EMBODIMENT

An editing system 10 using a data recording and reproducing apparatus 100 according to a preferred embodiment of this invention will now be described in detail with reference to the accompanying drawings.

Figure 1:
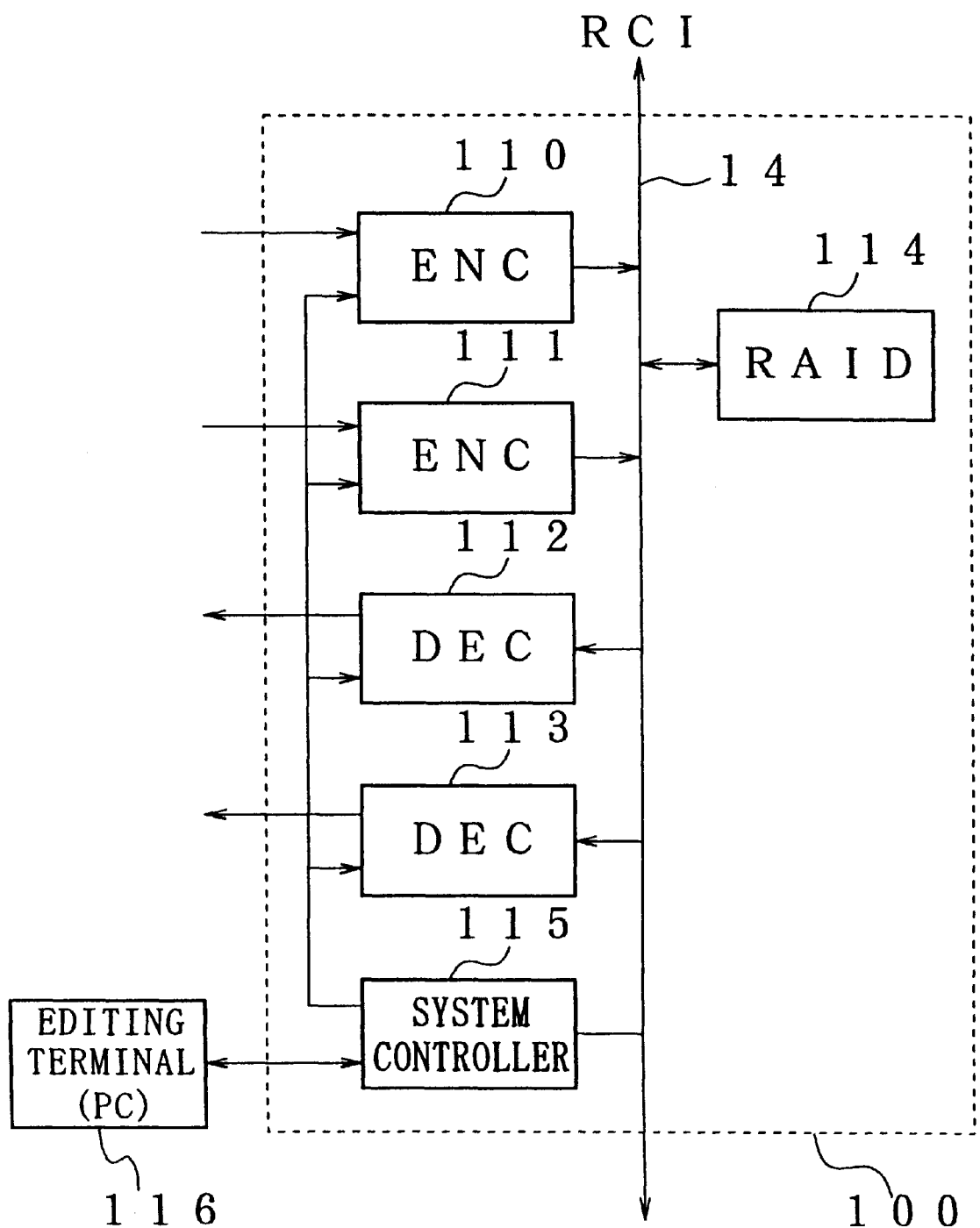
FIG. 1 is a conceptual view of a data recording and reproducing apparatus embodying the invention.

FIG. 1 shows an entire structure of the data recording and reproducing apparatus 100.

The data recording and reproducing apparatus 100 comprises a plurality of encoders 110, 111, a plurality of decoders 112, 113, RAID 114 and system controller 115, as a whole. They are connected to each other through PCI (Peripheral Component Interconnect) bus 14.

The encoders 110, 111 decode data including AV data (audio and/or video data) input from outside in accordance with a predetermined transfer format to translate the data into a form that may be processed by the data recording and reproducing apparatus 100. If necessary, the encoders 110, 111 compress the input data in accordance with compression system illustratively using interframe correlation based on MPEG (Moving Picture Experts Group) recommendations or an intraframe compression system based on DV system to output the data thus compressed to the PCI bus 14. In this case, the predetermined transfer format is exemplified by a transfer data based on SDI (Serial Digital Interface) format compliant with SMPTE (Society of Motion Picture and Television Engineering) standard (SMPTE-259M), and a transfer data based on SDTI (Serial Digital Transfer Interface) format compliant with SMPTE-305M standard.

The decoders 112, 113 output the data stored in the RAID 114 to the outside through the PCI bus 14. When the compressed data is stored in the RAID 114, the decoders 112, 113 expand the data and encode it in accordance with a predetermined transfer format to output it to the outside. In this case, the predetermined transfer format is also exemplified by the SDI format and the SDTI format. The decoders will be described later more in detail.

The RAID 114 is made up of a plurality of HDDs, for example, seven HDDs, which are parallel to each other. One of the HDDs is used for parity data. Thus, the RAID 114 is composed so as to be RAID-3 level.

The system controller 115 controls the encoders 110, 111, the decoders 112, 113 and RAID 114. The system controller 115 receives the control signal instructing the recording and reproducing of data from an editing terminal (PC) 116 connected to the system controller 115 and allows them to record and reproduce the data.

Further, the system controller 115 also supplies time slot signal to each encoder 110, 111 and each decoder 112, 113. Respective the encoders 110, 111 and the decoders 112, 113, to which the time slot signal is supplied, may be accessed to the RAID 114 at only the moment that they receive said time slot signal. This is to say, the encoders 110, 111, the decoders 112, 113 and RAID 114 are connected to one PCI bus 14 and therefore those data issued from them come into collision when they access the RAID 114 concurrently. In order to avoid the collision of the data, the time slot signal is supplied to them to arbitrate their rights for using the PCI bus 14. This causes each encoder 110, 111 and each decoder 112, 113 to appear as if they input and output respective data at the same time because the time slot is composed of a very short period of time.

Although the data recording and reproducing apparatus 100 as shown in FIG. 1 is composed of two encoders 110, 111 and two decoders 112, 113, a number of the encoder and the decoder is not limited. A variety of the component about the encoder and decoder such as one encoder and a plurality of the decoders, or one decoder and a plurality of the encoders is conceivable. In this case, the system controller 115 also supplies the time slot signal respectively to the encoders and the decoders to arbitrate their rights for using the PCI bus 14.

The data recording and reproducing apparatus 100 further is connected to the PC 116 so as to constitute the editing system 10.

The PC 116 is connected to the system controller 115 of the data recording and reproducing apparatus 100, as described above, and outputs the control signal for recording and reproducing the data, for editing special effect types in connection with audio signal and video signal, timing information and so on. The system controller 115 controls each part of the data recording and reproducing apparatus 100 based on said control signal.

The operations of the entire editing system 10 will be described.

Firstly, the editing terminal 116 outputs the control signal for instructing the recording of the data to the system controller 115. The system controller 115 outputs the control signal for instructing the recording of the data to each encoders 110, 111 based on the control signal received from the editing terminal 116.

Each of the encoders 110, 111 decode data receive from the outside in accordance with a predetermined transfer format such as SDI or SDTI to retrieve AV data therefrom, based on the control signal for instructing the recording of the data.

Necessary processes such as compression are performed on the AV data and then said processed data is stored temporarily in a memory, not shown.

The AV data is read out from the memory and output to the PCI bus 14 in a allocated time slot. Each of HDDs in the RAID 114 stores the input data input through the PCI bus 14 based on the control signal for instructing the recording of the data from the system controller 115.

When the system controller 115 receives a control signal for instructing the reproducing of data from the PC 116, each of the decoders 112, 113 outputs a control signal for instructing the reading of data from the RAID 114 in allocated time slot. At the next time slot, the data stored in the RAID 114 is read out. The decoders 112, 113 receive the data thus read out. Further, when the data is compressed in the MPEG format based on inter-frame correlation, it is expanded in accordance with MPEG format. Alternatively, when the data is compressed in an intraframe compression system such as DV system, it is expanded in accordance with inverse format to the intraframe compression system. The data is encoded in accordance with the external transfer format such as SDI and SDTI and the encoded data is output to the outside.

The configuration of the decoders 112, 113 will be described more in detail. Since the decoders 112, 113 have the same configuration, the sole description on the decoder 112 is given for the explanation.

Figure 2:
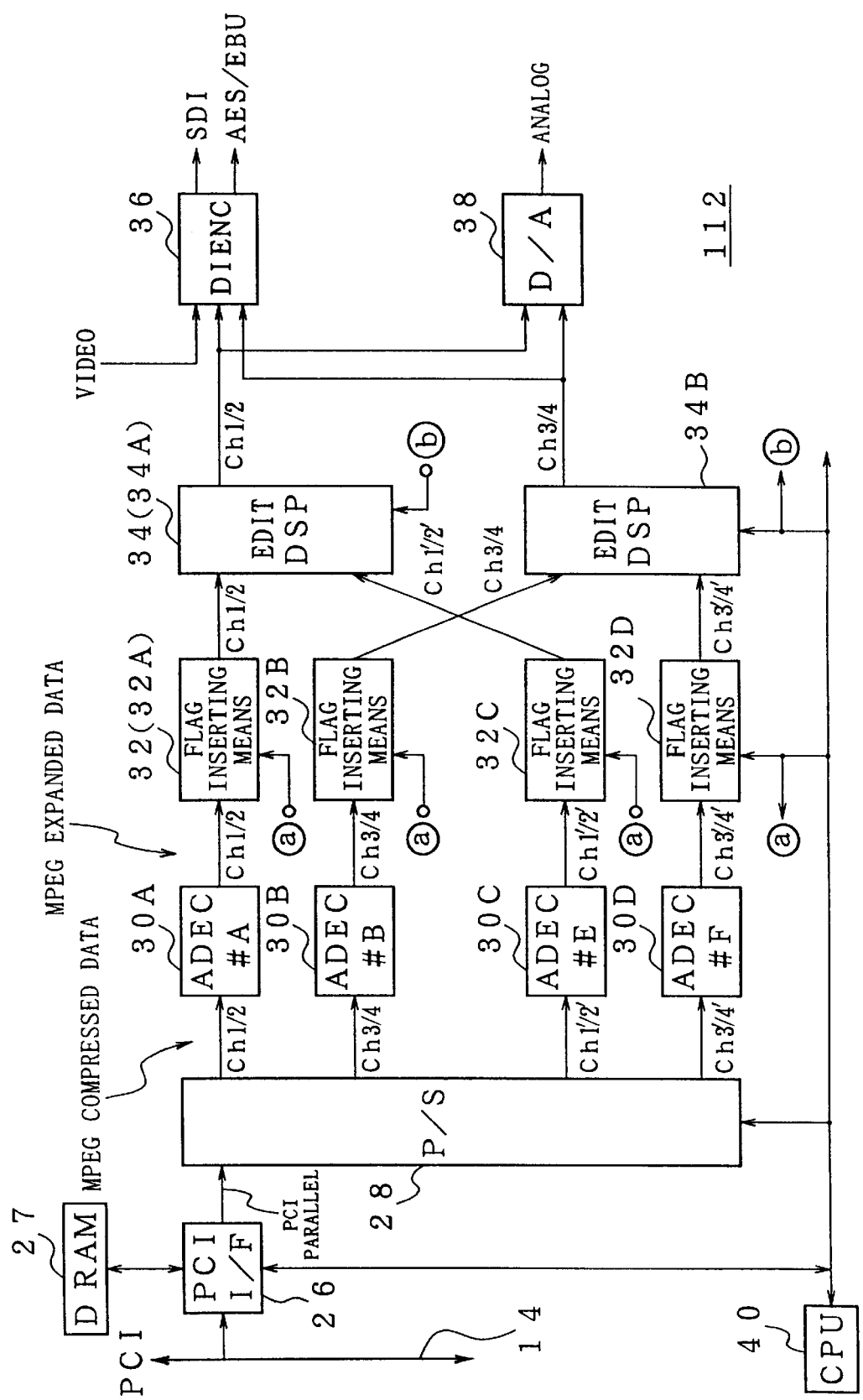
FIG. 2 is a partial schematic flow diagram of a typical decoder.

FIG. 2 shows a configuration of the decoder 112 for decoding audio data.

The decoder 112 comprises PCI interface (PCI I/F) 26, DRAM 27, parallel-to-serial converting circuit (P/S) 28, a plurality of audio decoders (ADEC) 30A through 30D for expanding the compressed audio data, a plurality of flag inserting means 32A through 32D for inserting a edit flag into the expanded audio data, edit DSPs 34A, 34B for performing editing process on the audio data based on the inserted edit flag, output encoder 36 for multiplying the edited audio signal and video signal and encoding the multiplied signal in accordance with the above SDI format to output the encoded signal, digital-to-analog converting circuit (D/A) 38 for converting the editing processed signal in the edit DSPs 34A, 34B to analog signal to output the converted signal, and CPU 40.

The PCI I/F 26 is used for transporting into the decoder 112 the compressed audio data that is input through the PCI bus 14 and allows the compressed audio data to be subjected to the data processing in the decoder 112.

The DRAM 27 stores the compressed audio data temporarily every two channels such as the compressed audio data of channel 1 and channel 2 and the compressed audio data of channel 1' and channel 2'. This is because special effect processes such as the cross-fade process are carried out as a unit of two channels.

The P/S 28 converts the compressed audio data that is input as parallel data, into compressed serial audio data.

Respective ADECs 30A through 30D expand the audio data subjected to MPEG compression.

Respective flag inserting circuits 32A through 32D insert flag (edit flag) for indicating, when editing process such as special effect process is carried out, a mark for carrying out the editing process into a data clock position corresponding to the type of the editing process.

The CPU 40 constituting a control portion transmits control signal (effect-processing instruction signal) for instructing the editing process to each flag inserting circuit and then respective flag inserting circuits 32A through 32D inserts the flag corresponding to the type of the editing process based on the effect-processing instruction signal.

The edit DSPs 34A, 34B are data processing circuits that respectively perform editing process such as the special effect on the input audio data to obtain edited audio data.

The DSPs 34A, 34B respectively perform the editing process on the audio data of two channels (ch1/ch2 and ch1'/ch 2': ch 3/ch 4 and ch 3' and ch 4'), which are associated with each other among flag-inserted audio data, to create a new edited audio data of two channels (ch1/ch2 and ch3/ch4).

The output encoder 36 adds video data to said new edited audio data and encodes it in accordance with a predetermined external transfer format such as the above SDI format to output the encoded data. As other predetermined external transfer format is exemplified AES/EBU (Audio Engineering Society/European Broadcasting Union) format, which is European broadcasting standard relating to the audio and video data.

The D/A circuit 38 converts the digital audio data of two channels (ch1/ch2 and ch3/ch4) to analog audio data to output it.

The operations of the entire decoder 112 will be described more in detail.

Firstly, the PCI I/F 26 receives compressed audio data through the PCI bus 14 and transmits it to the DRAM 27. The DRAM 27 stores it temporarily.

The P/S 28 receives the compressed audio data (parallel data) read from the DRAM 27 and converts said parallel data to serial compressed audio data. Then, the P/S 28 supplies the serial compressed audio data of two channels (ch1/ch2, ch3/ch4, ch1'/ch2' and ch3'/ch4') to respective ADECs 30A through 30D.

First ADEC 30A receives the serial compressed audio data of two channels, ch1/ch2, and expands the serial compressed audio data to obtain uncompressed audio data. Second through forth ADECs 30B through 30D respectively receives the serial compressed audio data of two channels, ch3/ch4, ch1'/ch2' and ch3'/ch4', and expands them to obtain uncompressed audio data, like the first ADEC 30A.

Respective flag inserting circuits 32A through 32D receive these uncompressed audio data and insert the edit flag of one bit for indicating editing-process-designating information to the audio data of the channel to be subjected to special effect process, which will be described hereinafter.

The insertion of the edit flag to a data clock position of audio data clock indicates the type of editing process, namely, special effect process. Therefore, it can identify the type of the special effect process to designate which data clock position the editing flag is inserted in audio data clock.

The CPU 40 controls flag inserting timing and so on.

Respective edit DSPs 34A, 34B receive the audio data (ch1/ch2 through ch3'/ch4'), to which the editing flag is inserted, and locate the data clock position where the flag is inserted. Then, they perform a special effect process according to said data clock position on the audio data and transmit the edited new audio data (ch1/ch2 and ch3/ch4) subjected to the special effect process to the output encoder 36 and the D/A converting circuit 38.

The output encoder 36 converts the new audio data (ch1/ch2 and ch3/ch4) into a predetermined external transfer format and output it. Alternatively, the D/A converting circuit 38 converts said new audio data into analog audio signal and output it.

FIGS. 3A through 3C show a format of uncompressed serial audio data, which the ADECs 30A through 30D output.

The audio data is sampled at a sampling frequency of 48 kHz, for example. 64 clock pulses constitute each cycle (an audio frame 64Fs shown in FIG. 3B) per one audio data sample. Audio data is allocated to channel 1 (ch1) and channel 2 (ch2), each of which is a half of the cycle (32 clocks). A bit for audio data is allocated to each clock.

A number of bits constituting a single sample in each channel of audio data is composed of 18 bits, as shown in FIG. 3C. Since 32 bits are allocated to each channel, the excess portion usually is padded with dummy data.

According to this invention, the flag inserting circuits 32A through 32D insert the edit flag constituting editing-process-designating information to the excess portion. The edit DSPs 34A, 34B perform the editing process on the audio data based on the inserted flag.

Figure 4:
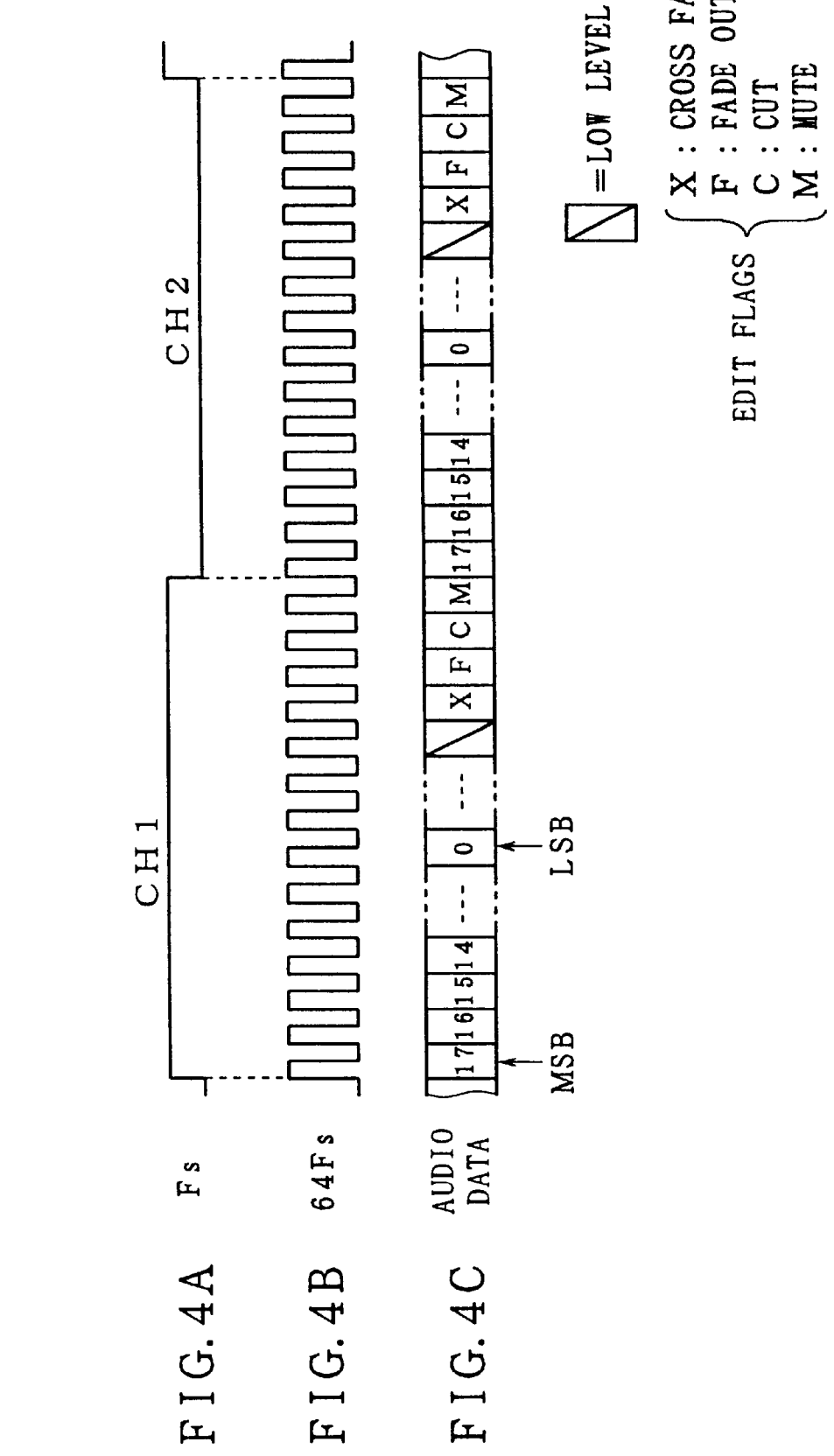
FIGS. 4A through 4C are explanatory views of edit flags.
Figure 5:
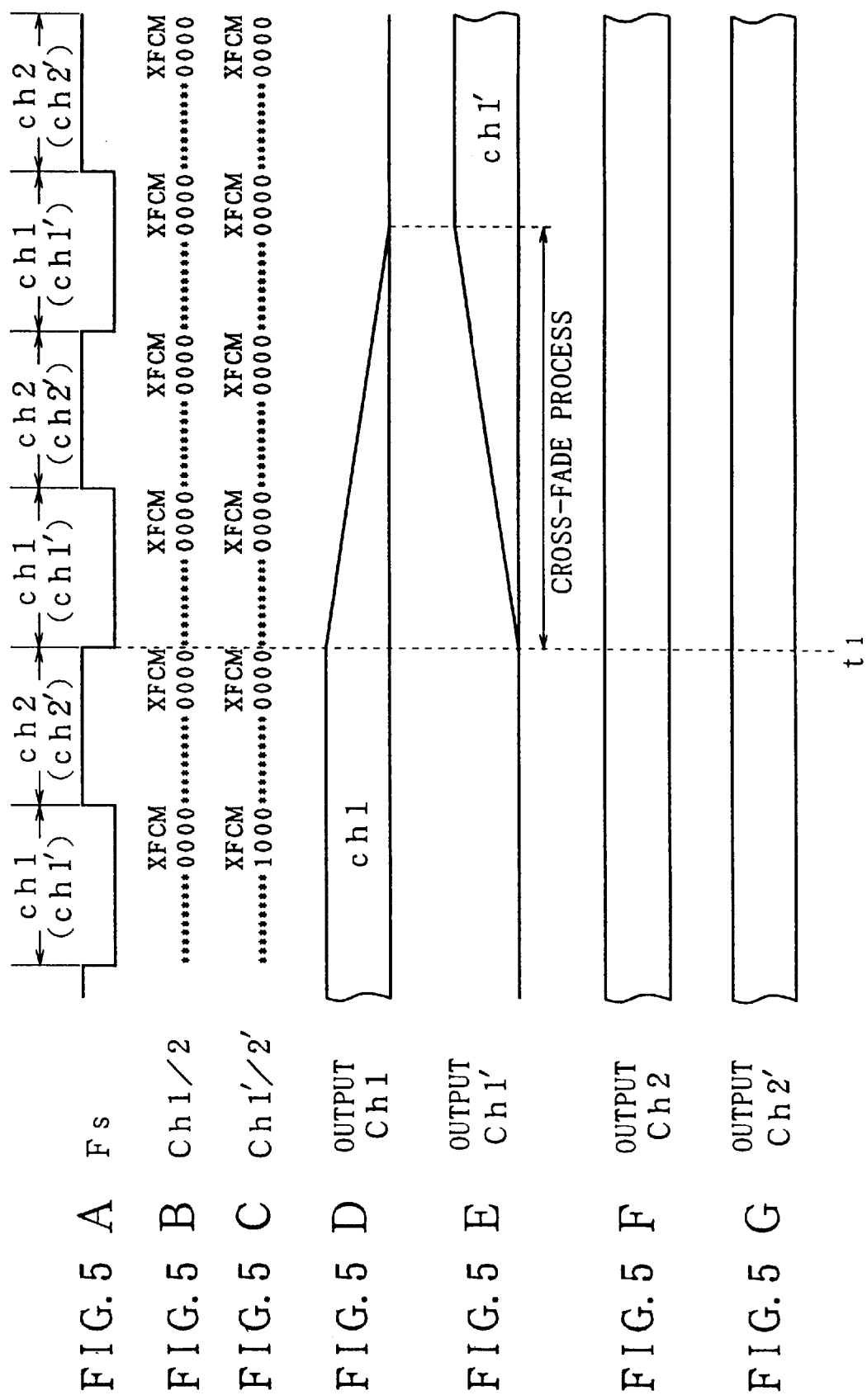
FIGS. 5A though 5G are charts showing an example of a cross-fade process.

FIGS. 4A through 4C show a format of the audio data to which the flag is inserted.

Figure 3:
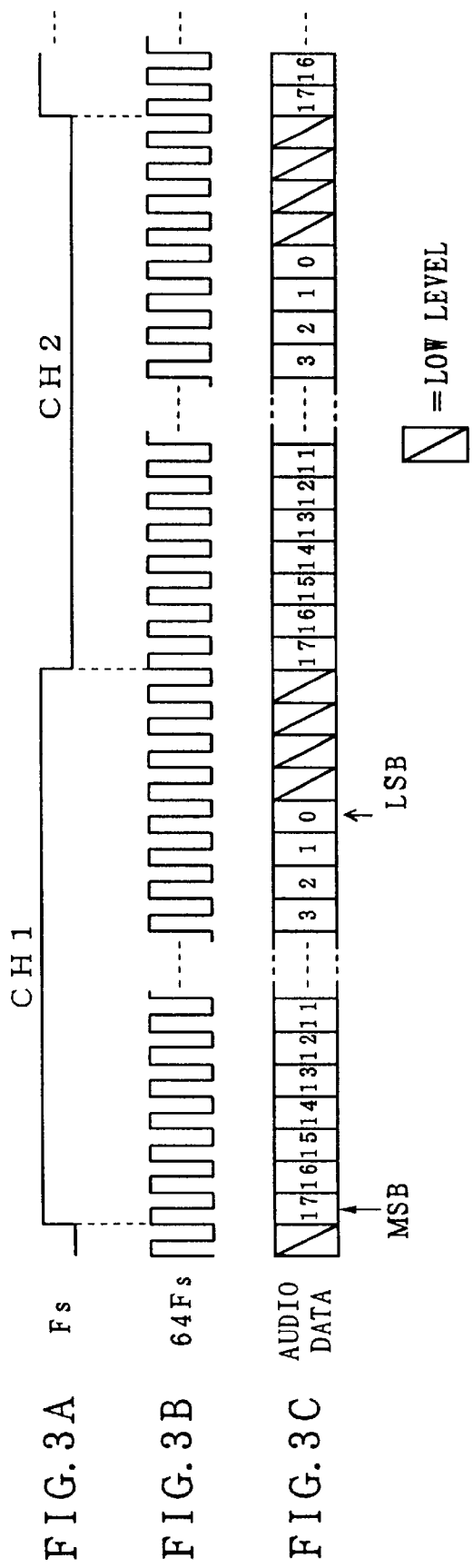
FIGS. 3A through 3C are charts showing a format of serial audio data.

64 clock pulses constitute each cycle per one audio data sample like the data format as shown in FIG. 3. Audio data is allocated to channel 1 and channel 2 (see FIGS. 4A and 4B). Illustratively, the flags for four different editing processes, namely, cross-fade (indicated by (X) in FIG. 4C), fade-out/fade-in (F), cut (C), and mute (M) are inserted to the excess 4 bits. In the example as shown in FIG. 4C, the flags of four bits are inserted to the last four bits of the excess bits allocated to a right side half of each half cycle. However, the flags may be inserted to the remaining bits of the excess bits or each four bits following LSB.

When cross-fade process is performed on the audio data, the 29th bit illustratively is set to "1" for the insertion of a flag X, as shown in FIG. 4C. Further, the remaining 30th, 31st and 32nd bits for insertion of respective a flag F denoting a fade-out/fade-in, a flag C representing a cut, and a flag M designating a mute, are all set to "0".

When the fade-out/fade-in process is performed on the audio data, the 30th bit is set to "1" and the remaining 29th, 31st and 32nd bits are all set to "0".

When the cut process is performed on the audio data, the 31st bit is set to "1" and the remaining 29th, 30th and 32nd bits are all set to "0".

When the mute process is performed on the audio data, the 32nd bit is set to "1" and the remaining 29th, 30th and 31st bits are all set to "0".

FIG. 4C shows one example, and thus the flag for indicating editing process may be inserted to a predetermined bit in the excess bits and correspond to the bit position and the editing process. For example, if data portion consists of 20 bits, 21st through 24th bits are used as the bits for inserting the flags for editing processes, as the above.

Further, these flags may also be inserted to the channel, which hear after the changeover of cross-fade. In other words, when the cross-fade process is performed on the audio data having different two channels such as channel 1 (ch1) before cross-fade and channel 1' (ch1') after cross-fade and the audio data of ch1' hear, the flag for indicating the cross-fade process may be inserted into a predetermined position of the audio data of ch1'.

Respective transition periods for fade-out/fade-in may be set previously and changed. The transition period previously is allocated to the above excess bits exclusive of the bits that the audio data is inserted, and then the edit DSPs 34A, 34B perform editing process on such audio data.

Further, the mute process may also be performed on a predetermined audio sample or the audio sample wherein the bit M is set to "1" as described above. When the mute process is performed on a predetermined audio sample, a target level (0 level or a level just before mute situation) may be attained illustratively at 64th audio sample.

FIGS. 5A through 5G show an example of cross-fade process that is performed on these audio data of the ch1 and the ch1'.

The audio data of ch1 (ch1') is allocated to a former half of the cycle and the audio data of ch2 (ch2') is allocated to a latter half of the cycle, as shown in FIG. 5A. In this case, the audio data of ch1 is faded out while the audio data of ch1' is faded in, as shown in FIGS. 5D and 5E.

Only flag X inserted to 29th bit in the former half of the audio data of ch1' is set to "1" as shown in FIG. 5C but the remaining flags are all set to "0" as shown in FIGS. 5B and 5C. Namely, only the flag X is inserted to the audio data.

When the flag X is inserted to a bit in the former half of the audio data, the audio data of ch1 is faded out within a set period, about one cycle in a shown case, of the start of next cycle while the audio data of ch1' is faded in.

However, no flag is inserted to a bit in the audio data of ch2 and ch2' as shown in FIGS. 5B and 5C. Therefore, the above fade process is not performed, as shown in FIGS. 5F and 5G.

The detailed configuration of the flag inserting circuits 32A through 32D shown in FIG. 2 will be described.

The flag inserting circuits 32A through 32D have the same configuration and then only the flag inserting circuits 32A will be described.

Figure 6:
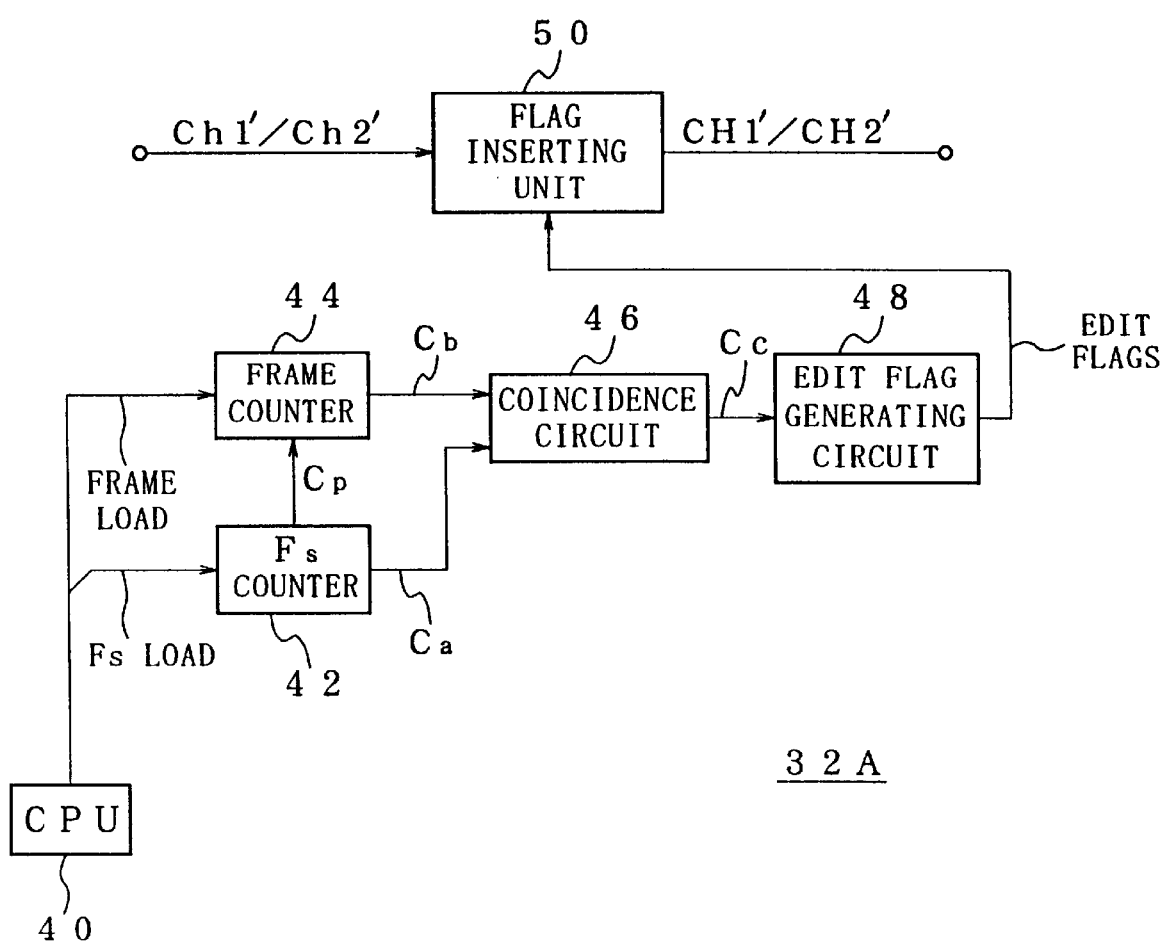
FIG. 6 is a partial schematic flow diagram of typical flag inserting means.

The flag inserting circuits 32A comprises CPU 40, counters 42, 44, a coincidence circuit 46, a edit flag generating circuit 48 and a flag inserting unit 50, as shown in FIG. 6.

The CPU 40 controls the entire decoder 112 and outputs load signal (Fs load) for indicating a bit position to which the flag (edit flag) is inserted, and audio frame information (frame load) for indicating an editing point.

Fs counter 42 loads the load signal and outputs counter output Ca when the bit position to which the flag (edit flag) is inserted, is reached.

Frame counter 44 loads audio frame information (frame load) for indicating an editing point and outputs counter output Cb when a set number of the audio frames is counted.

The coincidence circuit 46 monitors output state of the counter outputs Ca, Cb. When the both of the counter outputs Ca, Cb are obtained, the coincidence pulse Cc is output.

The edit flag generating circuit 48 generates a bit "1" corresponding to an edit flag at a timing of the trigger by the coincidence pulse Cc and outputs it. Therefore, the flag inserting unit 50 inserts the above edit flag to a set position of the audio data in synchronization with the bit obtained by the coincidence pulse Cc.

The operations of the flag inserting circuit 32A will be described.

Firstly, the CPU 40 determines a bit position of a channel that the flag is inserted, based on input editing-process-information (for example, cross-fade process) and generates the audio frame information for indicating the editing point and the load signal corresponding to the bit position that the frame is inserted.

The audio frame information is loaded (frame-loaded) into the frame counter 44. The load signal is loaded (Fs-loaded) into the Fs counter 42.

The frame counter 44 counts loaded audio frames and, upon counting a predetermined number (load frame) of audio frames, the frame counter 44 provides a counter output Cb.

The Fs counter 42 also counts audio clocks and, upon counting the bit position that the flag is inserted, the Fs counter 42 provides a counter output Ca.

The coincidence circuit 46 determines the bit position, in which the counter output Ca is obtained, within the audio frame, in which the counter output Cb is obtained, to be the flag inserting position, and provides the coincidence pulse Cc.

The edit flag generating circuit 48 outputs the edit flag at a timing of the coincidence pulse Cc. Therefore, a bit "1" corresponding to the edit flag is inserted to the audio bits.

In a example of FIGS. 5A through 5G, when the Fs counter 42 counts a predetermined bit position in the audio frame just before time t1, the Fs counter 42 supplies a bit"1" corresponding to the edit flag to the flag inserting unit 50. Since cross-fade process between ch1 and ch1' is designated in the example of FIG. 5, channel ch1', which is output audio data heard after cross-fade process, is selected and the editing flag, X=1 is inserted to 29th bit thereof.

The operations of the flag inserting circuits 32B, 32C, 32D are the same as those of the above flag inserting circuits 32A.

The configurations and operations of the edit DSP circuits 34A, 34B shown in FIG. 2 will be described.

Figure 7:
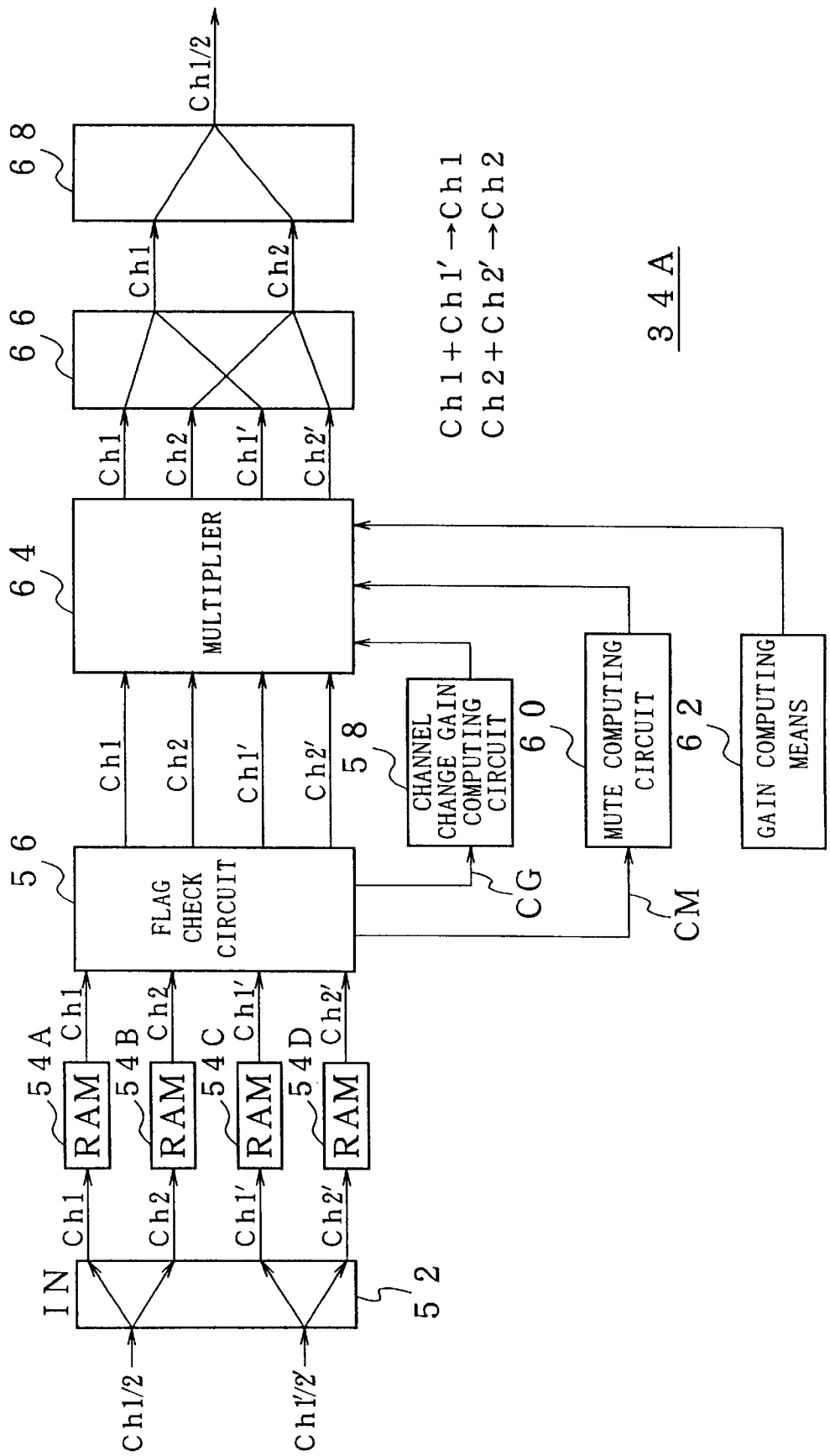
FIG. 7 is a partial schematic flow diagram of a typical DSP circuit for editing.

FIG. 7 shows a configuration of edit DSP circuit 34A. The edit DSP circuit 34B has the same configuration as the edit DSP circuit 34A.

The edit DSP circuit 34A comprises separating circuit 52, RAMs 54A through 54D, a flag check circuit 56, a channel change gain computing circuit 58, a mute computing circuit 60, a gain computing circuit 62, a multiplier 64, a mixing circuit 66 and output circuit 68.

The DSP circuit 34A is supplied with audio data regarding four channels (ch1/ch2 and ch1'/ch2'). The separating circuit 52 receives four-channel audio data and separates the audio data into data for individual channels, or example, ch1/ch2 into ch1 and ch2.

The RAMs 54A through 54D respectively are furnished corresponding to each channel and store the separated audio data corresponding to each channel temporarily therein. Alternatively, a single RAM may be installed to replace the channel-wise RAMs 54A through 54D.

The flag check circuit 56 checks whether or not the edit flag is inserted to a bit of the audio data read from the RAMs 54A through 54D. Therefore, the flag check circuit 56 checks edit flag insertion status each channel.

The checked audio data is output as it is. When a inserted flag represents any one of the cross-fade process, the fade-out/fade-in process and the cut process, a check signal CG corresponding to the relevant edit flag X, F or C is output. When it represents the mute process, a mute signal CM is output.

The channel change gain computing circuit 58 receives the check signal CG and computes a channel change gain coefficient (described later in more detail) for the input check signal.

When the mute computing circuit 60 receives the mute signal CM, the mute computing circuit 60 computes a mute coefficient to output a mute processed signal CM. Mute time is altered according to the computed mute coefficient.

The multiplier 64 multiplies the channel change gain coefficient and the mute coefficient etc. with audio data of the channel that the edit flag is inserted, and outputs edited audio data.

The mixing circuit 66 mixes the edited audio data of ch1 and ch1' to output new audio data of ch1. The mixing circuit 66 also mixes the edited audio data of ch2 and ch2' to output new audio data of ch2.

The output circuit 68 multiplexes the newly prepared audio data of ch1 and ch2 on a time division basis and outputs it as audio data of two-channel (ch1/ch2).

The operations of the edit DSP circuit 34A will be described.

The audio data of four channels (ch1/ch1' and ch2/ch2') wherein the edit flag is inserted to an audio data of any one of or a plurality of channels, is separated by the separating circuit 52 each channel. The separated audio data is stored temporarily in the RAMs 54A through 54D, each of which is installed for the corresponding channel.

The audio data read from the RAMs 54A through 54D is checked by the flag check circuit 56 relating to a question whether or not the edit flag is inserted to each channel, and a position of edit bit.

When the edit flag represents any one of the cross-fade process, the fade-out/fade-in process and the cut process, a check signal CG corresponding to the relevant edit flag X, F or C is output to the channel change gain computing circuit 58 wherein the channel change gain coefficient (described later in more detail) is computed according to each editing process.

The channel change gain coefficient (described later in more detail) is supplied to the multiplier 64 wherein the gain coefficient is multiplied with the audio data. Since the gain coefficient changes its value over time, the time for the transition leading up to a steady state varies with gain coefficient.

When edit flag represents a flag M indicating the mute process, a mute process signal CM is output from the flag check circuit 56 wherein the mute coefficient is computed based on the mute process signal CM. The mute time varies with the mute coefficient thus computed.

The edited audio data multiplied with gain and mute coefficients is supplied to the mixing circuit 66 wherein these audio data of ch1 and ch1' are mixed to output new audio data of ch1, and the audio data of ch2 and ch2' are mixed to output new audio data of ch2.

These newly prepared audio data of ch1 and ch2 are multiplexed by the output circuit 68 on a time division basis and outputs it as audio data of two-channel (ch1/ch2).

The gain of the audio data on any of the channels may be adjusted by utilizing the output of gain computing circuit 62. The CPU 40 may designate its gain value.

The gain and mute coefficients described above cause an effect process time to change. For example, when the cross-fade process is carried out, the time it takes to effect a cross-fade transition from the audio signal on one channel to that on another is shorter the greater the channel change gain coefficient, and longer the smaller the same gain coefficient. The channel change gain coefficient may be either a predetermined (fixed) value or a value varied as desired (fed from the CPU 40).

Both the channel gain coefficient and the mute coefficient vary within a range of 0 to 1. Suppose that "k" denotes a gain coefficient for channels ch1 and ch2 and that "k'" represents a gain coefficient for channels ch1'/ch2', with a state transition taking place in T samples (i.e., T items of audio data). In that case, in the example of FIG. 5D, the coefficient "k" changes from 1 to 0 on channel ch1 that has been a current channel up to the time t1, and "k'" changes from 0 to 1 in steps of 1/T on channel ch1' that has not been the current channel. That is, the coefficients are defined during the transition as:

$$k=(1-i)/T$$
$$k'=i/T (i=1, \ldots, T)$$

That means the audio output on the new channel ch1' after the editing process is given as:

$$ch1 = kS + k'S'$$
$$= (1-i)S/T + iS'/T$$

In the edit DSP circuits 34A, 34B, a maximum time required for the execution of the corresponding editing process based on the inserted edit flags is equal to one audio frame. Thus any delay caused by the processing of the edit DSP circuits 34A, 34B at any edit point is virtually negligible. With the inventive constitution described above, edit flags making up editing-process-designating information are inserted into audio data and then the DSP circuits 34A, 34B processes the inserted flags. This provides accurately performed editing processes constituting precision editing.

In the above embodiments, a case wherein the HDD is used as nonlinear accessible recording medium has been explained. However, the invention may be implemented by using other nonlinear accessible recording medium such as disk type recording medium, for example, DVD and MO (Magnet Optical) disk, semiconductor memory, for example, D-RAM and flash memory.

Further, in the above embodiments, a case wherein the editing process is performed on the compressed audio data has been explained. However, the invention may be implemented even if the editing process is performed on the uncompressed audio data.

Additionally, in the above embodiments, a case wherein the editing process is performed on the audio data of predetermined two channels (ch1 and ch1':ch2 and ch2') has been explained. However, the invention may be implemented even if the editing process is performed on the audio data of channels, ch1 and ch2 (or ch1' and ch2') in a case of changing channel, ch1' to ch2 and h2 to ch1'.

Further, the invention may be implemented even if ch1 and ch2 (or ch1' and ch2') are exchanged to each other in the P/S 28 of the encoders 110, 111 and the editing process is performed on them.

As described and according to the invention, information for designating editing processes is inserted into the audio data retrieved from a storage medium, and the data are edited on the basis of such the editing-process-designating information. The time required from detection of the designating information to execution of the corresponding editing process equals a single audio frame at most. With such short time periods needed for the processing, the precision of the editing as a whole is maintained. This ensures highly accurate edit processing.

As evident from the foregoing description, the present invention is adapted most advantageously to a randomly accessible editing apparatus.

While the above is a complete description of the preferred embodiments of the invention, various alternatives, modifications, and equivalents may be used. Therefore, the above description should not be taken as limiting the scope of the invention as defined by the appended claims.

What is claimed is:

1. A data reproducing apparatus comprising:
   a nonlinear accessible recording medium containing MPEG format encoded video and audio data; and
   a plurality of outputting means for processing encoded video and audio data read from said recording medium and outputting the processed data; said plurality of outputting means being accessible to said recording medium in an allocated time slot, wherein said outputting means includes:

inserting means for inserting an edit flag for designating an editing process for the audio data read from said recording medium; the edit flag comprising a single bit inserted into an excess-bit portion of an audio channel in the MPEG formatted data; and editing processing means for performing said editing process on said audio data on the basis of a time position of the edit flag inserted into the audio data, said audio data being output from said inserting means.

2. The data reproducing apparatus according to claim 1, wherein a position of said edit flag in said excess-bit portion of the audio channel indicates a type of editing process to be performed at said time position on the audio channel.

3. The data reproducing apparatus according to claim 1, wherein said edit flag designates at least one of cross-fade, fade-out and fade-in, cut, and mute type editing processes.

4. A data recording and reproducing apparatus comprising:

a nonlinear accessible recording medium containing MPEG format encoded video and audio data;

inputting means for processing MPEG format data, including audio and video data, being input from outside, and outputting the processed data to said recording medium; and outputting means for processing encoded video and audio data read from said recording medium and outputting the processed data; said inputting means and outputting means being accessible to said recording medium in an allocated time slot, wherein said outputting means includes:

inserting means for inserting an edit flag for designating an editing process for the audio data read from said recording medium; the edit flag comprising a single bit inserted into an excess-bit portion of an audio channel in the MPEG formatted data; and editing processing means for performing said editing process on said audio data on the basis of a time position of the edit flag inserted into the audio data, said audio data being output from said inserting means.

5. A data reproducing method for reproducing MPEG format encoded audio and video data using a data reproducing apparatus comprising a nonlinear accessible recording medium and a plurality of outputting means for processing encoded video and audio data read from said recording medium, said plurality of outputting means being accessible to said recording medium in an allocated time slot, the method comprising the steps of:

a first step of inserting an edit flag for designating an editing process for the audio data read from said recording medium; the edit flag comprising a single bit inserted into an excess-bit portion of an audio channel in the MPEG formatted data; and a second step of performing said editing process on said audio data on the basis of a time position of the edit flag inserted in said first step.

6. The data reproducing method according to claim 5, wherein a position of said edit flag in said excess-bit portion of the audio channel indicates a type of editing process to be performed at said time position on the audio channel.

7. The data reproducing method according to claim 5, wherein said edit flag designates at least one of cross-fade, fade-out and fade-in, cut, and mute type editing processes.

8. A data recording and reproducing method for recording and reproducing MPEG format encoded audio and video data using a data recording and reproducing apparatus comprising a nonlinear accessible recording medium, inputting means for processing MPEG format data, including audio and video data, and outputting the processed data to said recording medium, and outputting means for processing the encoded video and audio data read from said recording medium, said inputting means and outputting means being accessible to said recording medium in an allocated time slot, the method comprising the steps of:

a first step of inserting an edit flag for designating an editing process for the audio data read from said recording medium; the edit flag comprising a single bit inserted into an excess-bit portion of an audio channel in the MPEG formatted data; and a second step of performing said editing process on said audio data on the basis of a time position of the edit flag inserted in said first step.

* * * * *